Patented Oct. 21, 1941

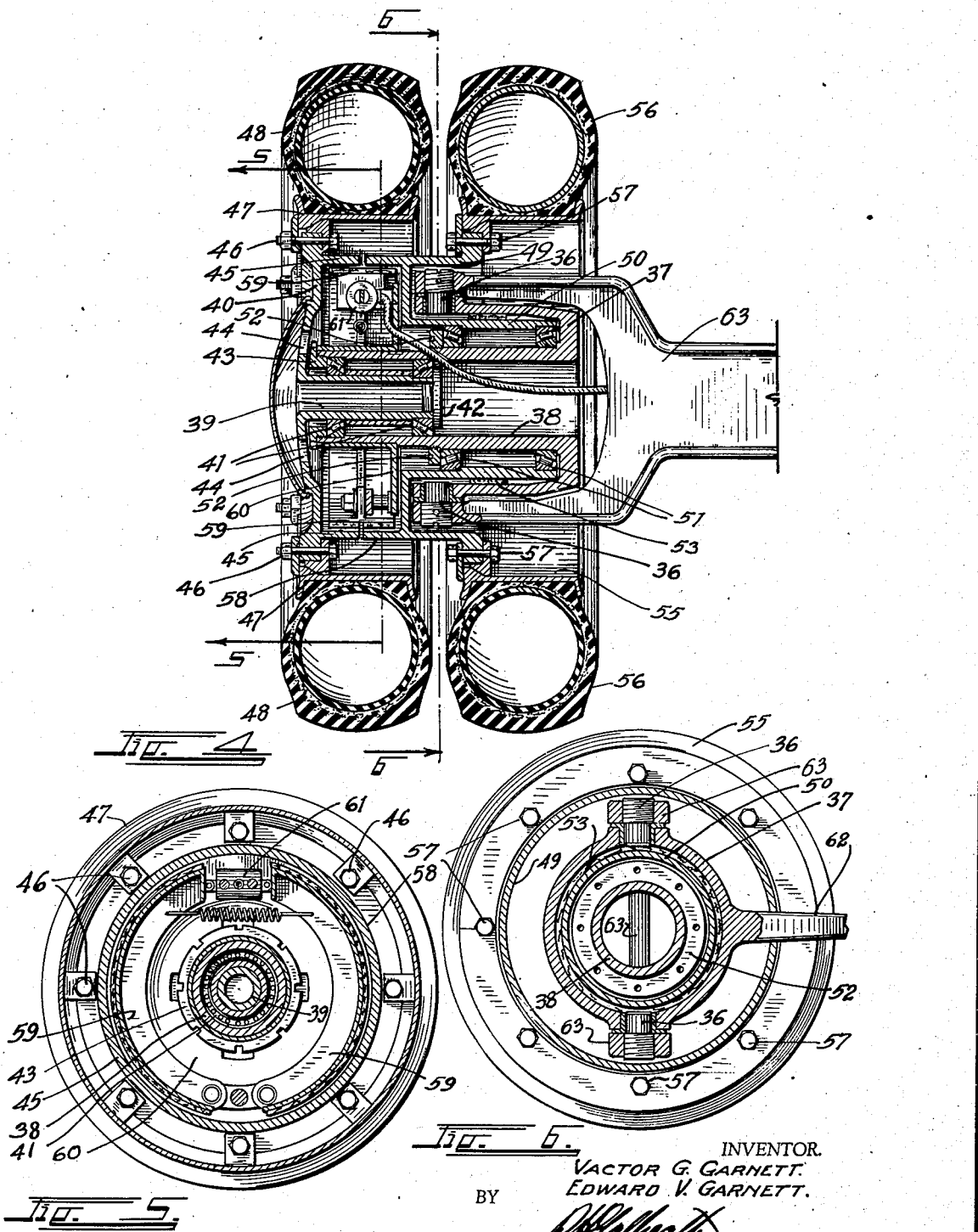

2,259,813

UNITED STATES PATENT OFFICE 2,259,813

FREE WHEELING DUAL WHEEL

Edward V. Garnett and Vactor G. Garnett, Denver, Colo.

Application May 27, 1940, Serial No. 337,483

11 Claims. (Cl. 280—96.3)

This invention relates to a dual wheel construction for vehicles. This application is a companion to Serial No. 337,482, filed simultaneously herewith.

In the usual dual wheel construction, two wheels with independent tires are locked together as an integral wheel unit, without any allowance for differential movement between the wheels. Naturally, in rounding curves and in traveling on the side of highly crowned pavements one of the dual wheels endeavors to travel at a higher rate of speed than the other. Since the wheels are locked together as a unit, however, they must rotate at the same speed and any differential in travel distance is taken up in tire friction on the road. As a result the tires of dual wheels wear away rapidly.

This objection to dual wheels has been recently recognized and attempts have been made to correct the trouble with use of differential gears and clutches between the wheels. Such constructions have been exceedingly heavy and exceedingly expensive and have introduced braking problems that have not as yet been satisfactorily solved. If a brake is applied to one wheel of a pair connected together differentially by gears the braking effect will be entirely neutralized if the other wheel does not have perfect traction and a differential movement will be introduced in the wheels resulting in unusual tire wear. If the wheels are independent of each other and the brake is applied to the inner wheel only, the braking effect of the outer wheel is not only lost but the outer wheel tends to reduce the tractive braking effect of the inner wheel.

The principal object of this invention is to provide a practical and efficient dual wheel construction in which the two wheels of the pair will roll entirely independent of each other at all times and in which a single braking element will act similarly and equally on both wheels of the pair without introducing differential braking strains.

While the invention is more particularly applicable to trailer wheels, another object of the invention is to provide an independently movable dual wheel construction which can be applied to the front or steering dual wheels of a vehicle; and in which a single set of brake shoes will act simultaneously against a braking drum on each of the wheels of a pair of dual wheels.

Other objects of the invention are to provide a device of this character, which will allow easy access to either wheel of a pair or to either tire for repair or replacement purposes; which will allow easy access to the brake shoes and drums for replacements or repairs; in which the loads of each wheel will be centralized over the bearings for that wheel; and in which the load imposed by the steering pivot, in the case of front or steering wheels, will be centralized between the two wheels to avoid all cantilever or bending stresses and equalize the road reactions on the steering gear.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a vertical section through a pair of dual wheels with the principles of the invention embodied therein.

Fig. 2 is a cross section taken on the line 2—2, Fig. 1.

Fig. 3 is a detail plan view of the bearing box employed in the invention.

Fig. 4 is a vertical section through a pair of dual wheels illustrating an alternate form of the invention.

Fig. 5 is a cross section through the alternate form, taken on the line 5—5, Fig. 4 illustrating the braking mechanism.

Fig. 6 is a similar cross section, taken on the line 6—6, Fig. 4, illustrating the steering pivot construction.

In Figs. 2, 4, and 5 the pneumatic vehicle tires have been omitted for clarity of illustration.

Referring to Figs. 1 and 2, a typical axle (more particularly a front axle) is illustrated at 10 with its steering pivots at 11. The outer tire and rim of a pair of dual wheels is shown at 12 and 13, respectively, and the inner tire and rim are shown at 14 and 15, respectively.

The outer rim 13 is detachably secured to a wheel disc 16 which in turn is secured to a flange 17 on the extremity of a stub shaft 18. The stub shaft is journalled in suitable bearings 19 in a bearing box 20 which is pivotally mounted on the steering pivots. The stub shaft is secured against endwise movement in the bearing box by means of a shaft nut 21 on its inner extremity. The nut and the bearings are protected by means of a dust cap 22.

The wheel disc 16 is formed with an annular

4. A dual wheel mounting for vehicles comprising: a tubular, non-rotatable bearing member; an outer wheel; a stub axle extending inwardly from said outer wheel into said bearing member and being journalled therein; an inner wheel positioned adjacent said first wheel and mounted for relative rotation therewith; a brake drum on each wheel adjacent each other; and brake shoe means for engaging both drums simultaneously.

5. A dual wheel mounting for vehicles comprising: a tubular, non-rotatable bearing member; an outer wheel; a stub axle extending inwardly from said outer wheel into said bearing member and being journalled therein; an inner wheel positioned adjacent said first wheel and mounted for relative rotation therewith; a brake drum on each wheel adjacent each other; brake shoe means for engaging both drums simultaneously; and means for pivotally mounting said bearing member on an axle for steering purposes.

6. A dual wheel mounting for vehicles comprising: a tubular, non-rotatable bearing member; an outer wheel; a stub axle extending inwardly from said outer wheel into said bearing member and being journalled therein; an inner wheel rotatably mounted on the outer wheel so that it may rotate relative thereto; an outer brake drum on said outer wheel; an inner brake drum on said inner wheel, said drums being of the same diameter and placed side by side to form a continuous double braking surface; and internally expanding brake shoes contacting both drums simultaneously.

7. A dual wheel mounting for vehicles comprising: a tubular, non-rotatable bearing member; an outer wheel; a stub axle extending inwardly from said outer wheel into said bearing member and being journalled therein; an inner wheel rotatably mounted on the outer wheel so that it may rotate relative thereto; an outer brake drum on said outer wheel; an inner brake drum on said inner wheel, said drums being of the same diameter and placed side by side to form a continuous double braking surface; internally expanding brake shoes contacting both drums simultaneously; and substantially vertical pivot means for securing said bearing member to the extremity of a vehicle axle.

8. A dual wheel mounting for vehicles comprising: a tubular, non-rotatable bearing member; an outer wheel; a stub axle extending inwardly from said outer wheel into said bearing member and being journalled therein; an inner wheel rotatably mounted on the outer wheel so that it may rotate relative thereto; an outer brake drum on said outer wheel; an inner brake drum on said inner wheel, said drums being of the same diameter and placed side by side to form a continuous double braking surface; internally expanding brake shoes contacting both drums simultaneously; and a brake supporting member for supporting said brake shoes, said latter member being fixedly mounted on said bearing member.

9. A dual wheel mounting for vehicles comprising: a non-rotatable, tubular bearing member; an outer wheel; a stub shaft fixed to said outer wheel and extending axially within one extremity of said tubular member; bearings for said stub shaft within said member; an inner wheel positioned alongside said outer wheel; and bearings rotatably mounting said second wheel on the exterior of said tubular member so that said wheels may rotate independently.

10. A dual wheel mounting for vehicles comprising: a non-rotatable, tubular bearing member; an outer wheel; a stub shaft fixed to said outer wheel and extending axially within one extremity of said tubular member; bearings for said stub shaft within said member; an inner wheel positioned alongside said outer wheel; bearings rotatably mounting said second wheel on the exterior of said tubular member so that said wheels may rotate independently; a cylindrical braking drum on the adjacent face of each wheel, said drums being of the same diameter and positioned side by side; and brake shoe means over-lapping the braking surface of both drums to exert a retarding action on both simultaneously.

11. A dual wheel mounting for vehicles comprising: a non-rotatable, tubular bearing member; an outer wheel; a stub shaft fixed to said outer wheel and extending axially within one extremity of said tubular member; bearings for said stub shaft with said member; an inner wheel positioned alongside said outer wheel; a sleeve on said inner wheel surrounding and journalled on said tubular bearing member rotatably supporting said inner wheel so that the two wheels may rotate independently; an outer housing surrounding said sleeve and fixed to the other extremity of said tubular bearing member; and means for pivotally mounting said outer housing in a bifurcated axle extremity for steering purposes.

EDWARD V. GARNETT.
VACTOR G. GARNETT.

Oct. 21, 1941.   J. A. GREEN ET AL   2,259,814
MINNOW OR LIVE BAIT BUCKET
Filed July 27, 1940
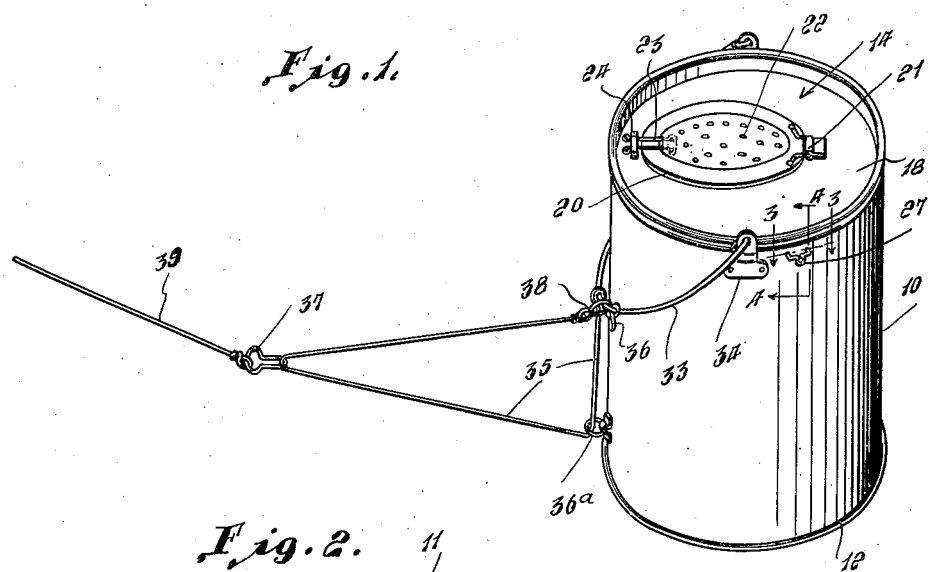
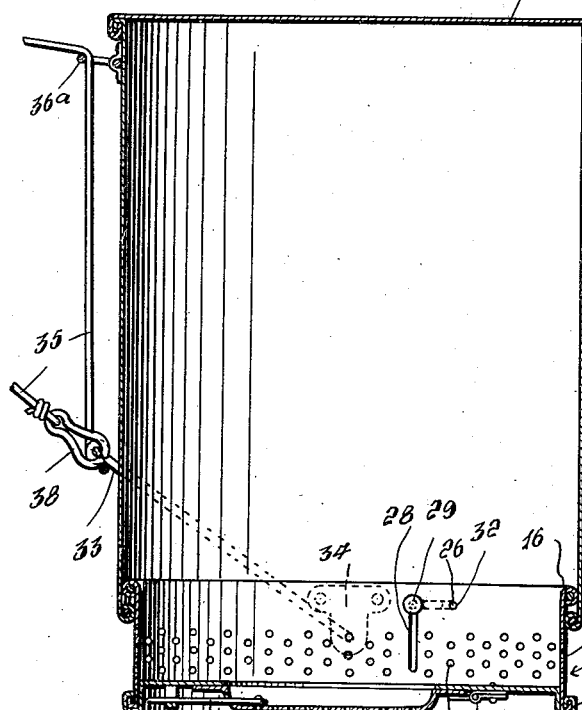
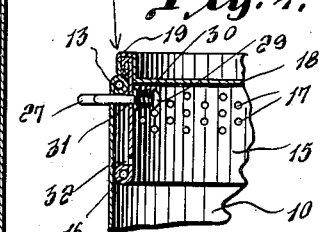
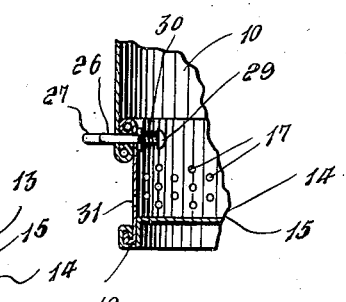
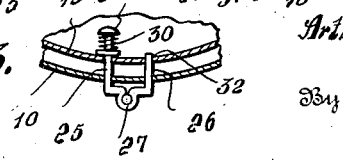
Inventors
James A. Green, Frank C. Miller,
Arthur J. Miller, William H. Locke
By
Attorney.